United States Patent
Bansal et al.

(10) Patent No.: US 11,429,410 B2
(45) Date of Patent: Aug. 30, 2022

(54) TAG BASED FIREWALL IMPLEMENTATION IN SOFTWARE DEFINED NETWORKS

(71) Applicant: Nicira, Inc., Palo Alto, CA (US)

(72) Inventors: Kaushal Bansal, Sunnyvale, CA (US); Uday Masurekar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 545 days.

(21) Appl. No.: 15/590,555

(22) Filed: May 9, 2017

(65) Prior Publication Data
US 2018/0329730 A1 Nov. 15, 2018

(51) Int. Cl.
| G06F 9/455 | (2018.01) |
| H04L 12/46 | (2006.01) |
| G06F 16/487 | (2019.01) |
| G06F 11/00 | (2006.01) |

(52) U.S. Cl.
CPC .......... *G06F 9/45533* (2013.01); *G06F 9/455* (2013.01); *G06F 9/45558* (2013.01); *G06F 16/487* (2019.01); *H04L 12/4645* (2013.01); *G06F 11/00* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| 8,396,946 | B1* | 3/2013 | Brandwine | H04L 41/08 709/220 |
| 8,689,349 | B2* | 4/2014 | Sahita | G06F 21/6281 726/26 |
| 8,832,820 | B2* | 9/2014 | Barjatiya | H04L 63/0209 726/13 |
| 8,938,775 | B1* | 1/2015 | Roth | G06F 21/606 726/1 |
| 8,955,036 | B2* | 2/2015 | Hugard, IV | H04L 63/104 726/1 |
| 9,294,507 | B1* | 3/2016 | Roth | H04L 63/20 |
| 9,304,801 | B2* | 4/2016 | Koorevaar | G06F 9/45558 |
| 9,380,025 | B2* | 6/2016 | Nellikar | H04L 63/0245 |

(Continued)

FOREIGN PATENT DOCUMENTS

WO WO-2017113273 A1 * 7/2017 ............ H04W 24/08

OTHER PUBLICATIONS

C. Dixon et al., "Software defined networking to support the software defined environment," in IBM Journal of Research and Development, vol. 58, No. 2/3, pp. 3:1-3:14, Mar.-May 2014, doi: 10.1147/JRD.2014.2300365. (Year: 2014).*

(Continued)

*Primary Examiner* — Abu Zar Ghaffari

(57) ABSTRACT

Systems, methods, and software to enhance the management of software defined networks. A controller is configured to maintain a data plane configuration for a virtual machine environment based on forwarding rules. The controller is further configured to identify a virtual machine group to be deployed in the computing environment, and identify tags associated with each virtual machine in the virtual machine group. Once the tags are identified, the controller may update the data plane forwarding configuration based on the identified tags and the forwarding rules.

17 Claims, 7 Drawing Sheets

(56) References Cited

U.S. PATENT DOCUMENTS

| | | | | |
|---|---|---|---|---|
| 9,544,186 | B2* | 1/2017 | Hallivuori | G06F 9/4843 |
| 9,563,480 | B2* | 2/2017 | Messerli | G06F 9/5072 |
| 9,866,529 | B2* | 1/2018 | Khanal | H04L 63/0272 |
| 10,007,536 | B2* | 6/2018 | Sugihara | G06F 9/455 |
| 10,044,619 | B1* | 8/2018 | Tonsing | H04L 49/3009 |
| 10,063,415 | B1* | 8/2018 | Kanakarajan | H04L 41/083 |
| 10,171,336 | B2* | 1/2019 | Kern | H04L 45/02 |
| 10,200,274 | B1* | 2/2019 | Suryanarayana | H04L 45/02 |
| 10,333,897 | B2* | 6/2019 | Arramreddy | H04L 63/0236 |
| 2005/0190758 | A1* | 9/2005 | Gai | H04L 12/4645 370/389 |
| 2013/0332983 | A1* | 12/2013 | Koorevaar | H04L 63/20 726/1 |
| 2014/0201157 | A1* | 7/2014 | Pawar | G06F 16/21 707/654 |
| 2014/0241247 | A1* | 8/2014 | Kempf | H04W 76/12 370/328 |
| 2014/0289730 | A1* | 9/2014 | Fitzgerald | G06F 9/5077 718/1 |
| 2014/0317677 | A1* | 10/2014 | Vaidya | H04L 63/20 726/1 |
| 2015/0052254 | A1* | 2/2015 | Zhao | H04L 67/101 709/226 |
| 2015/0063166 | A1* | 3/2015 | Sif | G06F 9/541 455/418 |
| 2015/0128209 | A1* | 5/2015 | Clevy | G06F 21/53 726/1 |
| 2015/0139238 | A1* | 5/2015 | Pourzandi | H04L 45/42 370/392 |
| 2015/0169340 | A1* | 6/2015 | Haddad | G06F 9/45533 718/1 |
| 2015/0169417 | A1* | 6/2015 | Brandwine | G06F 9/45533 714/4.11 |
| 2015/0195178 | A1* | 7/2015 | Bhattacharya | H04L 45/745 718/1 |
| 2015/0281036 | A1* | 10/2015 | Sun | H04L 45/64 370/248 |
| 2016/0028604 | A1* | 1/2016 | Chakrabarti | H04L 43/0852 370/252 |
| 2016/0065386 | A1* | 3/2016 | Hari | H04L 12/4679 370/254 |
| 2016/0149806 | A1* | 5/2016 | Park | H04L 45/586 370/254 |
| 2016/0269232 | A1* | 9/2016 | Hikichi | H04L 41/0893 |
| 2016/0373359 | A1* | 12/2016 | Bruun | H04L 47/20 |
| 2017/0026422 | A1* | 1/2017 | Klein | H04L 67/1021 |
| 2017/0041211 | A1* | 2/2017 | Pandya | H04L 45/02 |
| 2017/0075711 | A1* | 3/2017 | Berrange | G06F 9/45558 |
| 2017/0118173 | A1* | 4/2017 | Arramreddy | H04L 63/0236 |
| 2017/0149843 | A1* | 5/2017 | Amulothu | G06F 9/45558 |
| 2017/0250869 | A1* | 8/2017 | Voellmy | H04L 41/0893 |
| 2017/0310574 | A1* | 10/2017 | Wolting | H04L 45/02 |
| 2017/0339188 | A1* | 11/2017 | Jain | H04L 63/0428 |
| 2018/0062923 | A1* | 3/2018 | Katrekar | H04L 63/1425 |
| 2018/0109471 | A1* | 4/2018 | Chang | H04L 49/70 |
| 2018/0278541 | A1* | 9/2018 | Wu | H04W 24/08 |
| 2020/0021519 | A1* | 1/2020 | Schneider | H04L 45/38 |

OTHER PUBLICATIONS

A. Blenk, A. Basta, M. Reisslein and W. Kellerer, "Survey on Network Virtualization Hypervisors for Software Defined Networking," in IEEE Communications Surveys & Tutorials, vol. 18, No. 1, pp. 655-685, Firstquarter 2016, doi: 10.1109/COMST.2015. 2489183. (Year: 2016).*

* cited by examiner

| RULES 310 | SOURCES 312 | DESTINATIONS 314 | SERVICES 316 | ACTIONS 318 | ENTITY TAG 320 |
|---|---|---|---|---|---|
| RULE A 340 | SOURCE TAG | DESTINATION TAG | SERVICE A | ACTION A | ENTITY A ENTITY B |
| RULE B 341 | SOURCE TAG | DESTINATION TAG | SERVICE B | ACTION B | ENTITY A ENTITY B |
| RULE C 342 | SOURCE TAG | DESTINATION TAG | SERVICE C | ACTION C | ENTITY A ENTITY B |
| RULE D 343 | SOURCE TAG | DESTINATION TAG | SERIVCE D | ACTION D | ENTITY A ENTITY B |

DATA STRUCTURE 300

FIGURE 3

| RULES 310 | SOURCES 312 | DESTINATIONS 314 | SERVICES 316 | ACTIONS 318 | ENTITY TAG 320 |
|---|---|---|---|---|---|
| RULE A 340 | SOURCE TAG | DESTINATION TAG | SERVICE A | ACTION A | ENTITY A<br>ENTITY B<br>ENTITY C |
| RULE B 341 | SOURCE TAG | DESTINATION TAG | SERVICE B | ACTION B | ENTITY A<br>ENTITY B<br>ENTITY C |
| RULE C 342 | SOURCE TAG | DESTINATION TAG | SERVICE C | ACTION C | ENTITY A<br>ENTITY B<br>ENTITY C |
| RULE D 343 | SOURCE TAG | DESTINATION TAG | SERIVCE D | ACTION D | ENTITY A<br>ENTITY B<br>ENTITY C |

DATA STRUCTURE 500

FIGURE 5

TAG BASED FIREWALL IMPLEMENTATION IN SOFTWARE DEFINED NETWORKS

TECHNICAL BACKGROUND

In computing environments, software defined networks may be used that comprise software modules capable of providing a communication platform for one or more virtual nodes in the computing environment. These software defined networks, which may include virtual switches, routers, distributed firewalls, and the like, may be used to intelligently direct communication on the network by inspecting packets before passing them to other nodes on the same network. For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

To manage the software defined networks, a controller may be provided that is used to separate the control plane from the data plane of the networks. These controllers are used to define forwarding rules, or control mechanisms that direct a packet when it is identified by elements of the software defined network. In some implementations, this routing may include defining which nodes are associated with which networks, which security mechanisms are placed on communicating packets, or some other control mechanism with respect to the data plane of the software defined networks. However, although software defined networks and their associated controllers provide a valuable mechanism for routing packets for virtual machines, difficulties often arise when a larger number of forwarding rules are implemented for the software defined networks. In particular, as the number of rules increase, additional processing resources may be required in calculating the data plane forwarding configuration for the software defined networks.

OVERVIEW

The technology disclosed herein enhances the management of forwarding rules in software defined networks. In one implementation, a method of managing forwarding rules in software defined networks includes maintaining a data plane forwarding configuration based on forwarding rules, wherein the forwarding rules are applied based on tags associated with virtual machines in the software defined networks. The method further includes identifying a virtual machine group to be added to the computing environment, and identifying at least a first tag and a second tag associated with each virtual machine in the virtual machine group. The method also provides updating the data plane forwarding configuration based on the identified first tags, the identified second tags, and the forwarding rules.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 3 illustrates a forwarding rule data structure according to an implementation.

FIG. 5 illustrates a forwarding rule data structure with updated tags according to an implementation.

DETAILED DESCRIPTION

Figure 1:
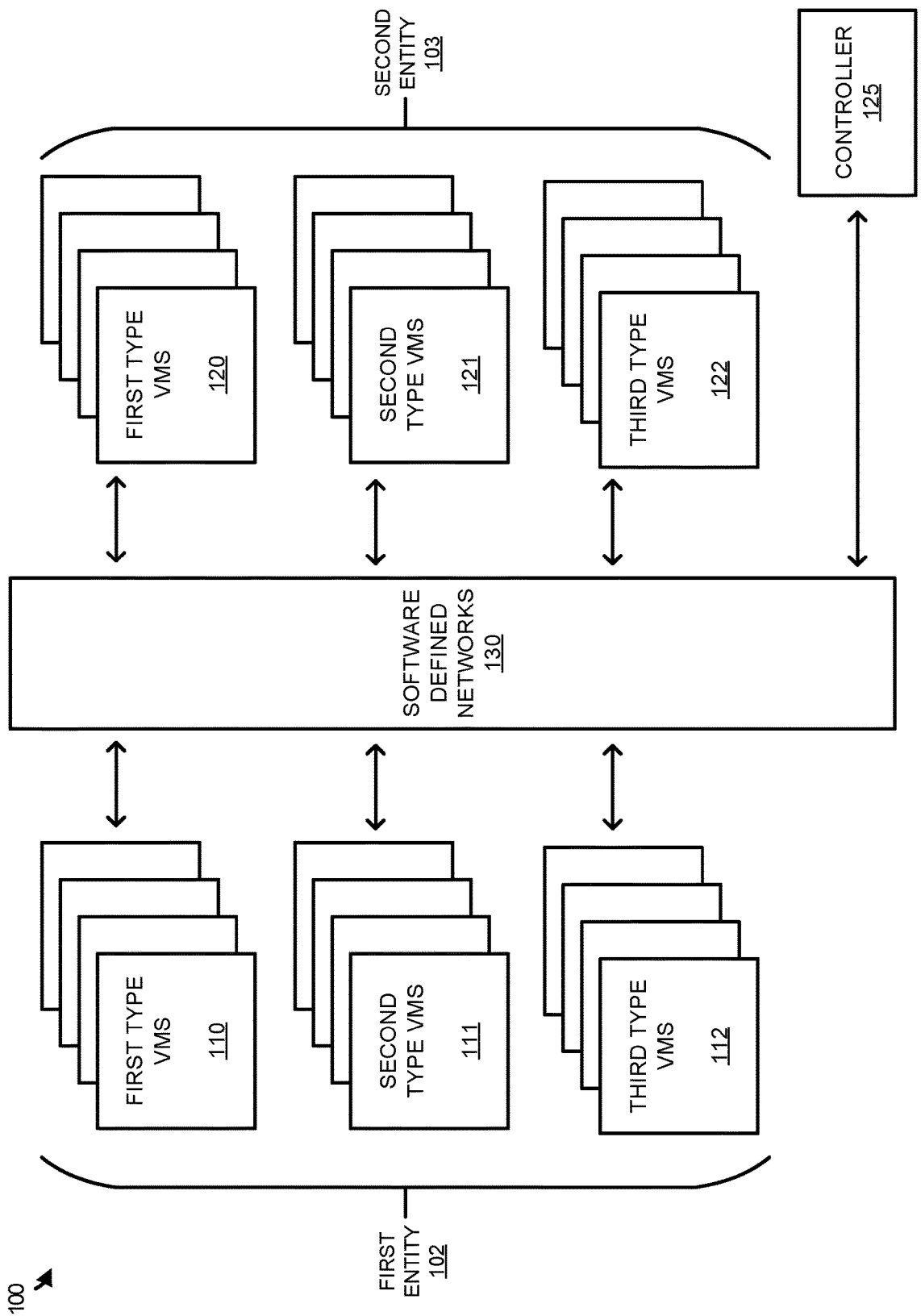
FIG. 1 illustrates a computing environment to manage data plane forwarding configurations according to an implementation.

The various examples disclosed herein provide enhancements for managing forwarding rules for software defined networks. In many virtualized computing environments, virtual network interfaces, virtual switches, virtual routers, and other similar elements may be used to segment virtual machine traffic and ensure that each of the virtual machines only communicates with other defined computing nodes. For example, an administrator may desire that a virtual machine providing front-end functionality for a first organization only communicate with virtual machines providing application functionality for the same organization.

In the present implementation, to provide the segmentation between entities (which may be used in multi-tenant service provider environments or software development environments) tags may be used in defining the various segmentation groups within the environment. In particular, a set of open ended forwarding rules may be defined for the software defined networks, and tags may be associated with deployed virtual machines, in some examples as metadata, to ensure that the virtual machines are allocated the proper data plane configuration. For example, returning to the example of a front-end virtual machine only being able to communicate with application virtual machines of the same entity, tags may be applied to the virtual machines, which may indicate the type of operation provided by the virtual machine (i.e. front-end operation or application operation) and may further provide an entity identifier tag, which may be used to separate the multiple entities within the software defined networks. Thus, a single set of forwarding rules may be defined for the software defined network controller, wherein the forwarding rules may define the types of virtual machines that are permitted to communicate with one another (i.e. front-end with application virtual machines). Once the forwarding rules are defined, virtual machines may be added to the software defined networks, wherein the virtual machines may be associated with a type of operation (or security group) tag and at least one entity tag that can be used in separating the communications between various entities in a shared environment. Based on the tags, a data plane forwarding configuration may be updated for the software defined networks to implement the rules, wherein the data plane forwarding configuration may identify attributes (MAC addresses, IP addresses, logical ports, and the like) for communicated packets and forward the packets to enforce the defined rules.

In some implementations, in updating the data plane forwarding configuration, the controller may, for each virtual machine to be added to a network, identify tags associated with the virtual machine. Once the tags are identified, the controller may traverse the other virtual machines of the environment to identify other virtual machines with tags capable of communicating with the virtual machine. After identification, attributes for the other virtual machines may be used in updating logic of the data plane configuration for the software defined networks to permit the virtual machine to communicate with the other virtual machines.

Although described herein using virtual machines, it should be understood that similar operations may be provided to other virtual endpoints or nodes, such as Linux containers, Docker containers, and other similar namespace based containers. Rather than requiring a separate operating system, which is required for virtual machines, containers may share resources from the host computing system, wherein the resources may include kernel resources from the host operating system, and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint.

FIG. 1 illustrates a computing environment 100 to manage data plane forwarding configurations according to an implementation. Computing environment 100 includes virtual machines (VMs) 110-112 for first entity 102 and VMs 120-122 for second entity 103. To provide communication functionality for VMs 110-112 and VMs 120-122 software defined networks 130 is included, which is used to manage packet forwarding based on forwarding rules provided by an administrator using controller 125.

VMs 110-112 and 120-122 may execute on one or more host computing systems with software defined networks 130, wherein software defined networks 130 may be provided via one or more hypervisors for VMs 110-112 and 120-122. The host computing systems may each comprise communication interfaces, network interfaces, processing systems, computer systems, microprocessors, storage systems, storage media, or some other processing devices or software systems, and can be distributed among multiple devices. These host computing systems can each include software such as an operating system, logs, databases, utilities, drivers, natural language processing software, networking software, and other software stored on a computer-readable medium. Controller 125 may reside wholly or partially on the host computing systems or may reside on a separate computing system in some examples that is capable of configuring the data plane of software defined networks 130 on the host computing systems. Although illustrated as separate from software defined networks 130, it should be understood that controller 125 may be considered part of software defined networks 130.

In operation, an administrator of software defined networks 130 may generate forwarding rules that can be used to manage communications over the software defined networks. These forwarding rules may each indicate characteristics, such as sources for communications, destinations for communications, and communication protocols, and may further define actions based on the characteristics, such as permit, block, and the like. Using the example of computing environment 100, a rule may define that first type VMs are permitted to communicate with second type VMs using a particular protocol. However, if the first type VMs attempt to communicate with any other VMs or outside systems, a rule may be defined to prevent the communication. In many implementations, software defined networks 130 may be implemented as part of one or more hypervisors executing on one or more host computing systems, wherein the hypervisors may allocate logical ports and addressing to each of the virtual machines.

Here, in addition to the tags that define the type of virtual machine operations, such as first type operations, second type operations, and third type operations, tags may also be allocated to each of the virtual machines to indicate an entity associated with the virtual machines. For example, a first entity, such as a first organization using computing environment 100 may use a tag associated with first entity 102, while a second organization using computing environment 100 may use a tag associated with second entity 103. Here, rather than defining a separate rule set for each of the entities, a single rule set may be deployed that can then be applied in the data plane based on the tags associated with the virtual machines. Consequently, although first entity 102 and second entity 103 may each use first type VMs, the communications of the first type VMs may be separated based on the tag associated with the respective entity.

Referring to the example of the first type of VMs being permitted to communicate with the second type of VMs using a first protocol, a rule may be defined at controller 125 that supports this interaction. Once the rule is defined, virtual machines may be added to computing environment 100 that can use the rule while maintaining separation with their corresponding entity. Referring to the example of adding first type VMs 120 and second type VMs 121 for second entity 103. First type VMs 120 may be allocated a first tag that indicates the VMs are of the first type, and may further be allocated a tag that indicates they are associated with second entity 103. As a result, when deployed, first type VMs 120 may only be permitted to communicate with second type VMs 121 due to the tag associated with second entity 103. Similarly, first type VMs 120 may be prevented from communicating with second type VMs 111 due to second type VMs 111 being associated with a tag for first entity 102. By providing multiple tags to virtual machines and using the tags to segregate network communications, virtual machines for various entities and purposes may share a forwarding rule set, while maintaining segregation in the software defined networks.

Figure 2:
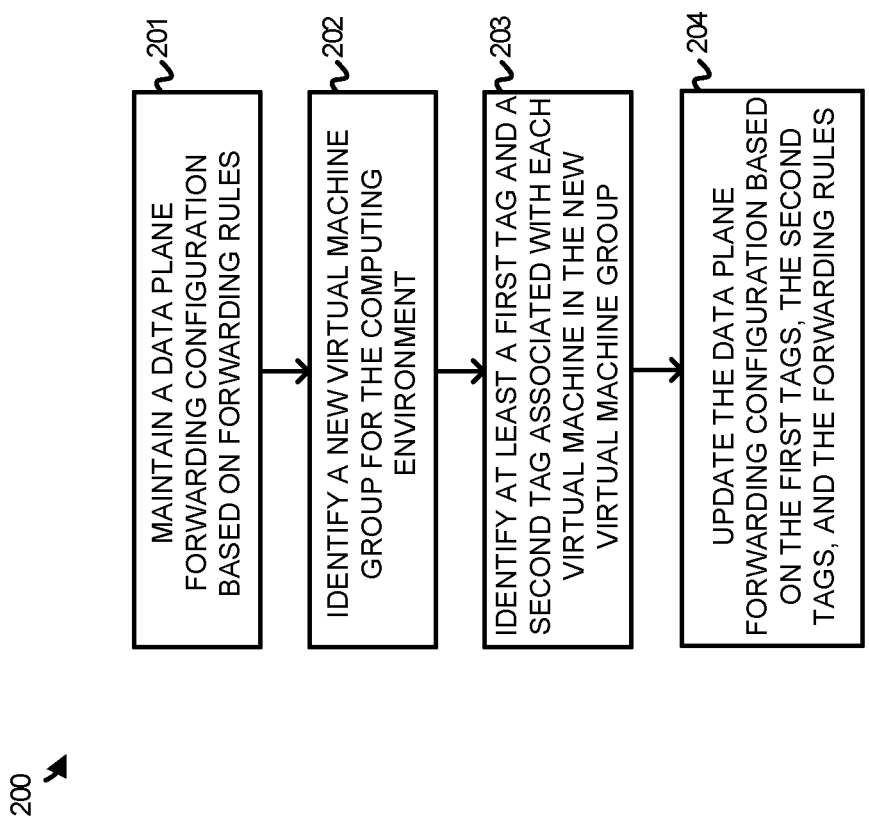
FIG. 2 illustrates a method of managing data plane forwarding configurations according to an implementation.

To further demonstrate the operations of configuring the software defined networks, FIG. 2 is provided. FIG. 2 illustrates a method 200 of managing data plane forwarding configurations according to an implementation. The processes of operation 200 are referenced parenthetically in the paragraphs that follow with reference to systems and elements of computing environment 100 of FIG. 1. In some implementations, the operations of method 200 may be executed by a controller, such as controller 125, for software defined networks 130.

As depicted in FIG. 2, method 200 includes maintaining (201) a data plane forwarding configuration based on forwarding rules, wherein the forwarding rules are applied based on tags associated with virtual machines in software defined networks 130. This set of forwarding rules may be generated by an administrator of computing environment 100 using controller 125, wherein the rules may define characteristics, such as approved source type virtual machines, destination type virtual machines, a protocol for the communications, and an action to be taken when the attributes are identified. For example, a forwarding rule may define that application virtual machines may communicate with database virtual machines that operate as the same entity or group. Consequently, an application virtual machine associated with a first entity may only communicate with database virtual machines that are associated with the same entity. Referring to the example in computing environment 100, if virtual machines of the first type are only permitted to communicate with virtual machines of the second type, then first type VMs 110 may only communicate with second type VMs 111, as they both belong to the same entity.

Once the rules are defined for the data plane forwarding configuration, operation 200 further includes identifying (202) a virtual machine group to be added to computing environment 100. For example, VMs 120-122 may be identified that are to be added to software defined networks 130, wherein VMs 120-122 are associated with second entity 103. Once the virtual machines are identified, operation 200 may identify (203) at least a first tag and a second tag associated with each virtual machine in the virtual machine group. In particular, these tags may define the type of operation of the virtual machine (such as first type, second type, or third type), and the entity associated with the virtual machines. Accordingly, for first type VMs 120, the tags associated with the virtual machines may include a tag that defines the virtual machine is a first type VM, and a second tag that defines the virtual machine as being associated with second entity 103. In some implementations, the virtual machines may be associated with metadata or other identifiers that are used in defining the tags for the virtual machines. Thus, when a virtual machine is initiated within the computing environment, the hypervisor (or container platform for namespace containers) may identify that the virtual machine is deployed and identify the tags associated with the virtual machine. These tags may then be provided to the controller for the software defined networking configuration operations.

Here, after the tags are identified for each of the virtual machines in the new virtual machine group, the method further updates (204) the data plane forwarding configuration based on the first tags, the second tags, and the forwarding rules that were identified for the new virtual machines. Referring again to adding the virtual machines associated with second entity 103, tags for VMs 120-122 may be used to define the forwarding configuration in the data plane of software defined networks 130. To provide this configuration, controller 125 may, for each of the new virtual machines, identify tags related to the virtual machines. For example, for a virtual machine in first type VMs 120, controller 125 may parse or search other virtual machines of software defined networks 130 to determine approved virtual machine communications. Thus, if VMs of the first type were only permitted to communicate with the VMs of the second type (defined by the forwarding rules), then a virtual machine in first type VMs 120 would only be permitted to communicate with second type VMs 121. Once second type VMs 121 are identified as available for communicating with the VM in first type VMs 120, internet protocol (IP) addresses, logical port identifiers, and other similar addressing information may be used to update the data plane forwarding configuration. This may include updating flow operations or flow tables provided in software defined networks 130, limiting the source address of the virtual machine in first type VMs 120 to communicating with destination addresses of second type VMs 121.

In some implementations, in determining which of the virtual machines are available to communicate with a particular VM, controller 125 may search software defined networks 130 to identify virtual machines that are capable of communication with the particular VM. For example, using a VM in first type VMs 120, controller 125 may identify all virtual machines that are tagged with a second type VM tag, which is capable of communicating with first type VMs. Once the second type VMs are identified, which would include second type VMs 111 and second type VMs 121, controller 125 may determine which of the VMs are associated with a tag for second entity 103. Accordingly, only second type VMs 121 may be identified for communication with the first type VM, and the data plane configuration may be configured appropriately. This configuration may include permitting communications from the first type VM with a first IP address to communicate with second type VMs 121 using their associated IP addresses. Although this is one example, it should be understood that software defined networks 130 may employ MAC addresses, logical port identifiers, or some other similar attribute in determining how to forward a packet using a flow table or other similar forwarding logic.

FIG. 3 illustrates a forwarding rule data structure 300 according to an implementation. Data structure 300 includes columns for rules 310, sources 312, destinations 314, services 316, actions 318, and entity tag 320. The column for rules 310 includes identifiers for rules 340-343. Although illustrated in the example of data structure 300 with four rules, it should be understood that any number of rules may be applied to software defined networks.

As described herein, administrators of software defined networks may generate forwarding rules that dictate how communications are forwarded between virtual computing elements of the software defined networks. For example, a rule may permit a front-end virtual machine to communicate with an application virtual machine. Here, in addition to the tags associated with the operation group or security group identifier of the virtual machine, represented in data structure 300 as sources 312 and destinations 314, virtual machines are also provided with an entity tag represented in entity tag column 320. These entity tags permit segregation to be implemented in software defined networks without generating new forwarding rules for each entity using the computing environment. For example, the virtual machines of "ENTITY A" may be associated with and allocated a different tag than the virtual machines of "ENTITY B." Accordingly, when determining the data plane forwarding configuration, multiple tags including the type of operation provided by the virtual machine and the entity associated with the virtual machine may be used in determining the communication configuration.

As an example, rule A 340 may define that front-end virtual machines are capable of communicating with application virtual machines. To provide this configuration, the source tag for rule A 340 may comprise a metadata term to be associated with front-end virtual machines, such as "FRONT_END." Similarly, a metadata term may be associated with the application virtual machines, such as "APPLICATION." Additionally, the service in services 316 may indicate the protocol that is permitted for the communication, and action in actions 318 may indicate that the communication is "PERMITTED." In addition to the source and destination tags, virtual machines may further be divided by entity tags 320, wherein a front-end virtual machine may also be associated with either a metadata tag for "ENTITY A" or "ENTITY B." These metadata tags may be used to limit the number of rules required for the environment, and permit segregation by the security tags, as well as the entity tags. Thus, although multiple entities may both use virtual machines that are classified with the security tag "FRONT_END," the virtual machines may be segregated based on their entity tags.

Figure 4:
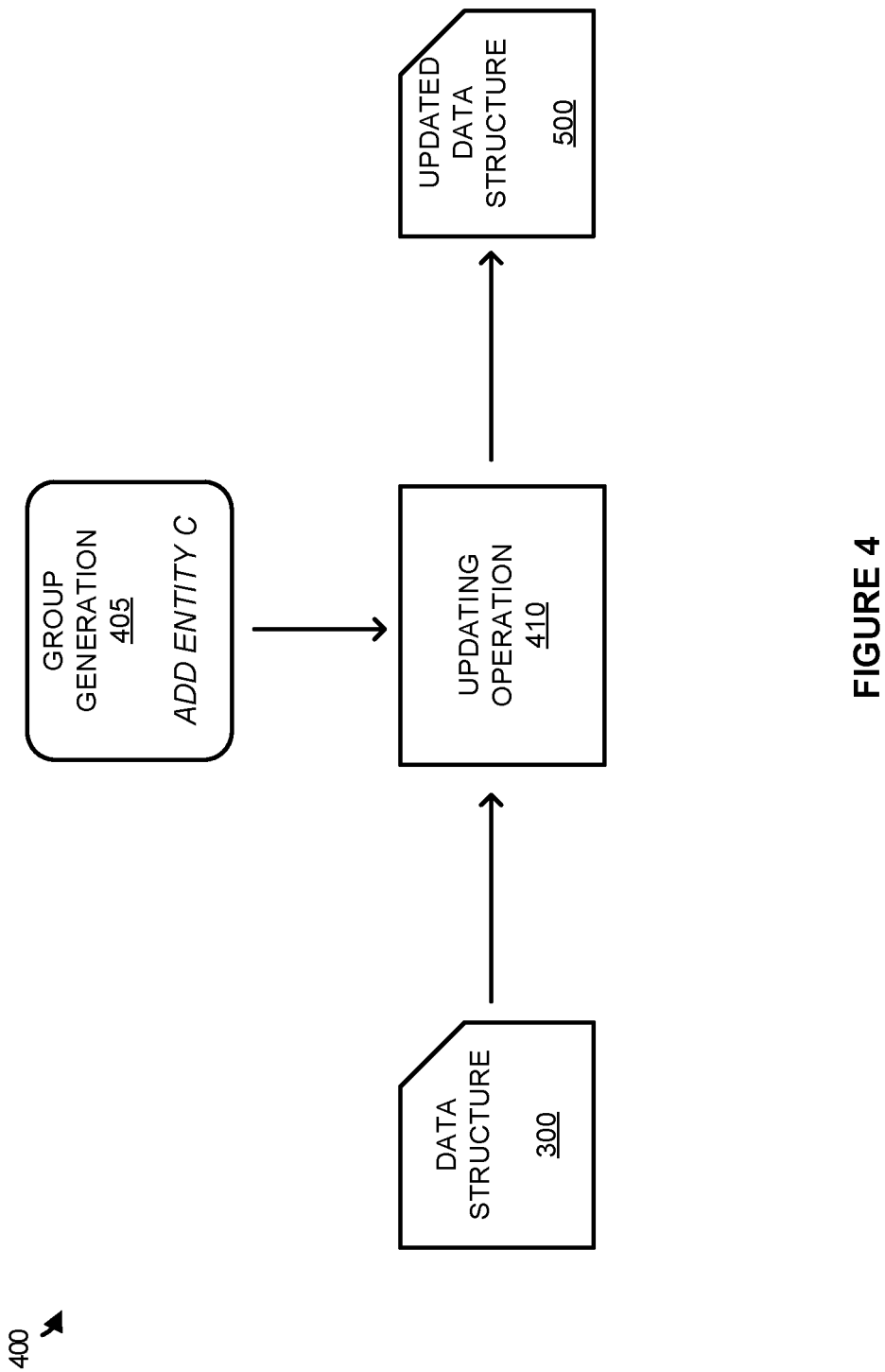
FIG. 4 illustrates an operational scenario of adding a new entity to a computing environment according to an implementation.

FIG. 4 illustrates an operational scenario 400 of adding a new entity to a computing environment according to an implementation. Operational scenario 400 is an example of adding a new entity to the environment represented by data structure 300 of FIG. 3. Operational scenario 400 includes data structure 300, updating operation 410, group generation 405, and updated data structure 500.

As depicted in FIG. 4, an administrator of a computing environment may generate forwarding rules that can be used by multiple entities of the computing environment. These forwarding rules may separate virtual machines based on their operation (sometimes referred to as a security group), such as front-end operations, application operations, database operations, or any other similar type operation. To provide this separation, the virtual machines may be allocated a tag based on the type of operation, sometimes referred to as security group classification, associated with the virtual machine. Thus, a front-end virtual machine may be provided with a front-end tag, whereas a database virtual machine may be provided with a database tag. In addition to the tags associated with the operations of the virtual machine, tags may be assessed to the virtual machines to provide segregation between entities or organizations that are sharing the computing environment. Referring to the example in FIG. 4, a new set of virtual machines may be generated for the computing environment and allocated a tag associated with "ENTITY C." Consequently, after group generation 405, updating operation 410 may be implemented by a controller of software defined networks to configure the data plane. The rule structure may then appear similar to updated data structure 500, which includes the newly created tags for "ENTITY C."

In some implementations, in providing updating operation 410, a controller may, for each of the new virtual machines, identify tags associated with the virtual machine. Once identified, the controller may traverse the other virtual machines of the software defined networks to identify virtual machines capable of communicating with the virtual machine. For example, a front-end virtual machine associated with "ENTITY C" may be permitted to communicate with application virtual machines also associated with "ENTITY C." To provide the communications, the controller may identify all virtual machines with both the tag associated with an application virtual machine and the tag associated with "ENTITY C." Once identified, a forwarding configuration may be implemented in the software defined networks (e.g. in the virtual switches, virtual network interfaces, or some other data plane element), such that the front-end virtual machine may communicate with any identified application virtual machines associated with "ENTITY C."

In some implementations, the forwarding configuration of the software defined networks may include one or more flow tables or data structures that can identify attributes of the communication (such as source and destination IP addresses, logical ports, and the like) and determine whether the communication should be forwarded to the destination computing element based on the attributes. Using the example of the front-end virtual machine above, the data structures of the software defined networks may be updated to permit communications with a source address of the front-end virtual machine to communicate with IP addresses of the application virtual machines of the same entity. As a result, when a communication is identified from the front-end virtual machine to an application virtual machine of the same entity, the communication may be permitted and forwarded to the destination virtual machine. In contrast, if the communication is targeted at a virtual machine providing a different operation other than an application and/or the virtual machine belongs to a different entity, the communication may be blocked prior to delivery to the virtual machine. Although the previous example uses IP addresses for the forwarding logic of the software defined networks, it should be understood that similar attribute operations may be applied using other addressing information for the virtual machines.

In some implementations, as virtual machines are instantiated or shut down, the hypervisor for the virtual machines may be configured to identify the occurrence of such events, and communicate a notification to the software defined network controller. This notification may further include information about the virtual machines, such as an identifier for the virtual machine, and any tags associated with the virtual machine. Based on the information provided, the controller may calculate any updates to the data plane, such as adding or removing an IP address, MAC address, logical port, and the like associated with the virtual machine from forwarding tables or data structures of the software defined networks.

FIG. 5 illustrates a forwarding rule data structure 500 with updated tags according to an implementation. Data structure 500 includes the same columns as data structure 300 of FIG. 3, including rules 310, sources 312, destinations 314, services 316, actions 318, and entity tag 320. Here, data structure 500 is representative of the tags that may be used in segregating and securing communications for a plurality of entities. In particular, columns for sources 312 and destinations 314 provide tags defining the type of operations for source and destination virtual machines, which can be referred to as security group tags. For example, an application virtual machine may be permitted to communicate with a database virtual machine to provide the required operation. Here, in addition to the operation type or security group tags associated with virtual machines, virtual machines are also provided with an entity tag, which is used to differentiate between different entities using the same computing environment. These entities may be different groups within an organization, different organizations, development groups, or some other similar entity. As a result, when deployed as a forwarding configuration, forwarding data structures and logic of the software defined networks may be configured based on the operation provided by the virtual machine, and the entity corresponding to the virtual machine.

Although illustrated in the example of FIGS. 3-5 as providing a single entity tag with virtual machines, it should be understood that more than one entity tag may be provided with the virtual machines. For example, an entity may include one or more sub-entities and a second tag may be used to distinguish between the groups of virtual machines.

Figure 6:
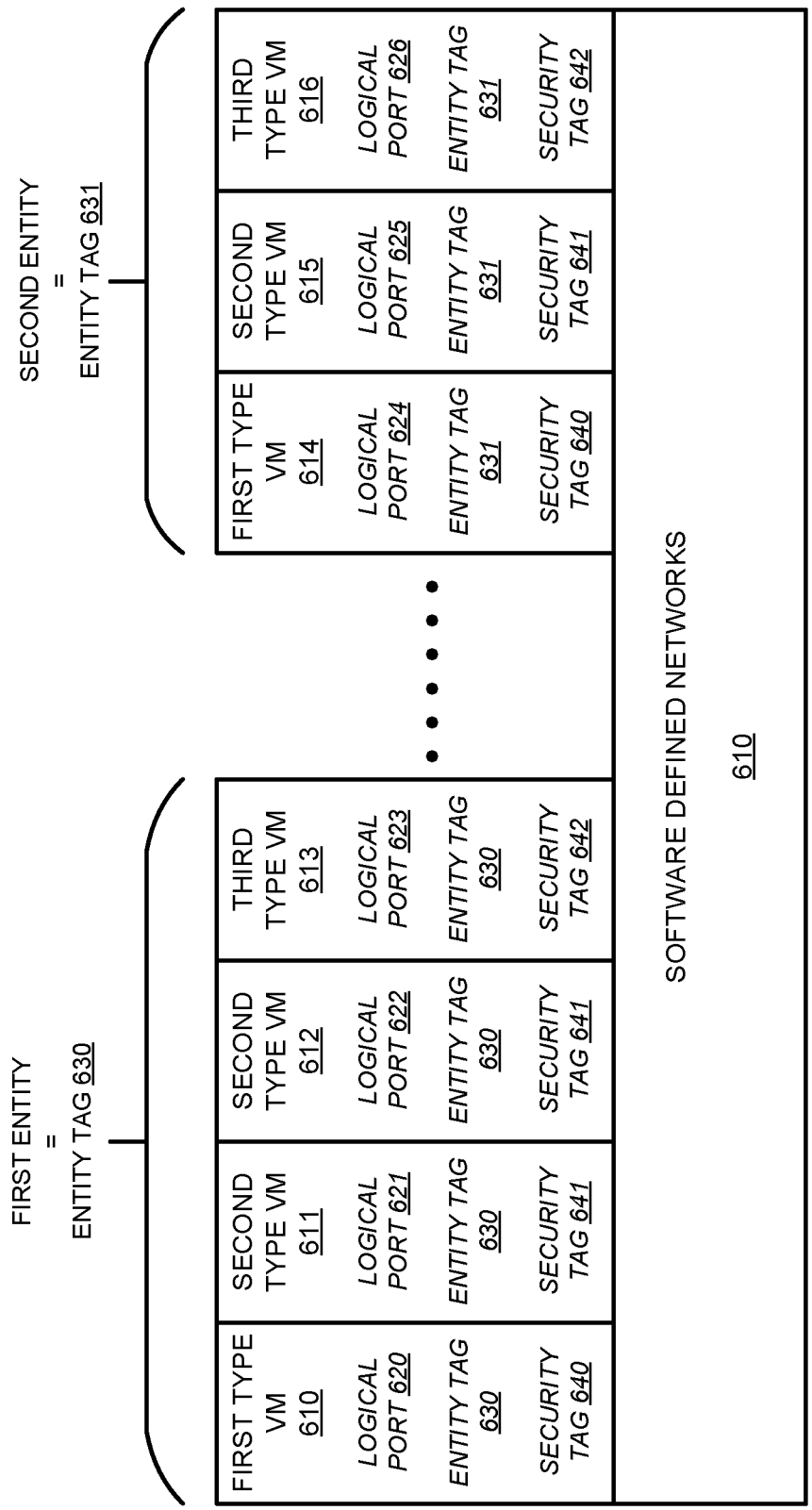
FIG. 6 illustrates a computing environment to manage data plane forwarding configurations according to an implementation.

FIG. 6 illustrates a computing environment 600 to manage data plane forwarding configurations according to an implementation. Computing environment 600 includes software defined networks 610, which provides communication connectivity between virtual machines (VMs) 610-616. VMs 610-613 correspond to first entity with entity tag 630, and VMs 614-616 correspond to a second entity with a second entity tag 631. Virtual machines 610-616 are allocated logical ports 620-626, and are associated with various entity tags 630-631 and security tags 640-642. Entity tags 630-631 are representative of an entity identifier that is used to segregate the virtual machines of a first entity from virtual machines that are co-executing in computing environment 600. Security tags 640-642 are representative of operational tags that are used to define the operations of the virtual machines. For example, in web application deployment, different security tags may be used to define the front-end virtual machines, the application virtual machines, and the database virtual machines. However, it should be understood that different classifications may be used for the operations of the virtual machines.

In operation, when a virtual machine group is to be deployed, such as the virtual machine group associated with entity tag 630, tags are identified for each of the virtual machines by a controller responsible for configuring software defined networks 610. These tags include the entity tag 630, and the security tag 640, 641, or 642 for each of the virtual machines. For example, for VM 610, a controller may identify entity tag 630 for the virtual machine and may further identify security tag 640. Once the tags are identified, the controller may traverse the other virtual machines in the computing environment to identify any virtual machines that are capable of communication with VM 610. In particular, if virtual machines associated with security tag 640 were only permitted to communicate with virtual machines associated with security tag 641, the controller may identify all virtual machines associated with security tag 641, which would include VMs 611, 612, and 615. Additionally, to ensure the segregation between different entities, the controller may identify the entity tag associated with the virtual machines to ensure that only virtual machines of the same entity are approved for communication. Consequently, because VMs 611-612 share an entity tag with VM 610, VMs 611-612 may be identified for approved communications with VM 610. Once identified, attributes, such as the logical ports associated with the identified VMs, may be used in configuring logic (such as flow tables) of software defined networks 610, such that, when a communication is identified, it may be forwarded or blocked based at least in part on the source and destination logical ports. In particular, as a communication is identified by software defined networks 610 from VM 610, the destination port may be used to determine if the communication is destined for VMs 611-612. If the communication is targeted to VMs 611-612, the communication will be forwarded, otherwise, the communication may be blocked.

Although illustrated in the previous example configuring the data plane for a single virtual machine, it should be understood that similar operations may be applied to each virtual machine coupled to software defined networks 610. These operations include identifying the tags associated with the virtual machine, identifying one or more other virtual machines capable of communication with the virtual machine based on the tags, and once identified, configuring the data plane forwarding configuration to permit the virtual machine to communicate with the one or more other virtual machines.

In some implementations, as virtual machines are instantiated or shut down, the hypervisor for the virtual machines may be configured to identify the occurrence of such events, and communicate a notification to the software defined network controller. This notification may further include information about the virtual machines, such as an identifier for the virtual machine, and any tags associated with the virtual machine. Based on the information provided, the controller may calculate any updates to the data plane, such as adding or removing an IP address, MAC address, logical port, and the like associated with the virtual machine from forwarding tables or data structures of the software defined networks.

While demonstrated in the example of FIG. 6 as using the logical ports in the forwarding configuration, it should be understood that other communication attributes may be used in enforcing the forwarding configuration. These attributes may include the MAC addresses of the virtual machines, the IP addresses of the virtual machines, or any other similar attribute that can be compared against information identified in a communication. For example, the source and destination IP address may be identified by software defined networks 610 for a communication, and a forwarding action may be determined based on the source and destination address.

Figure 7:
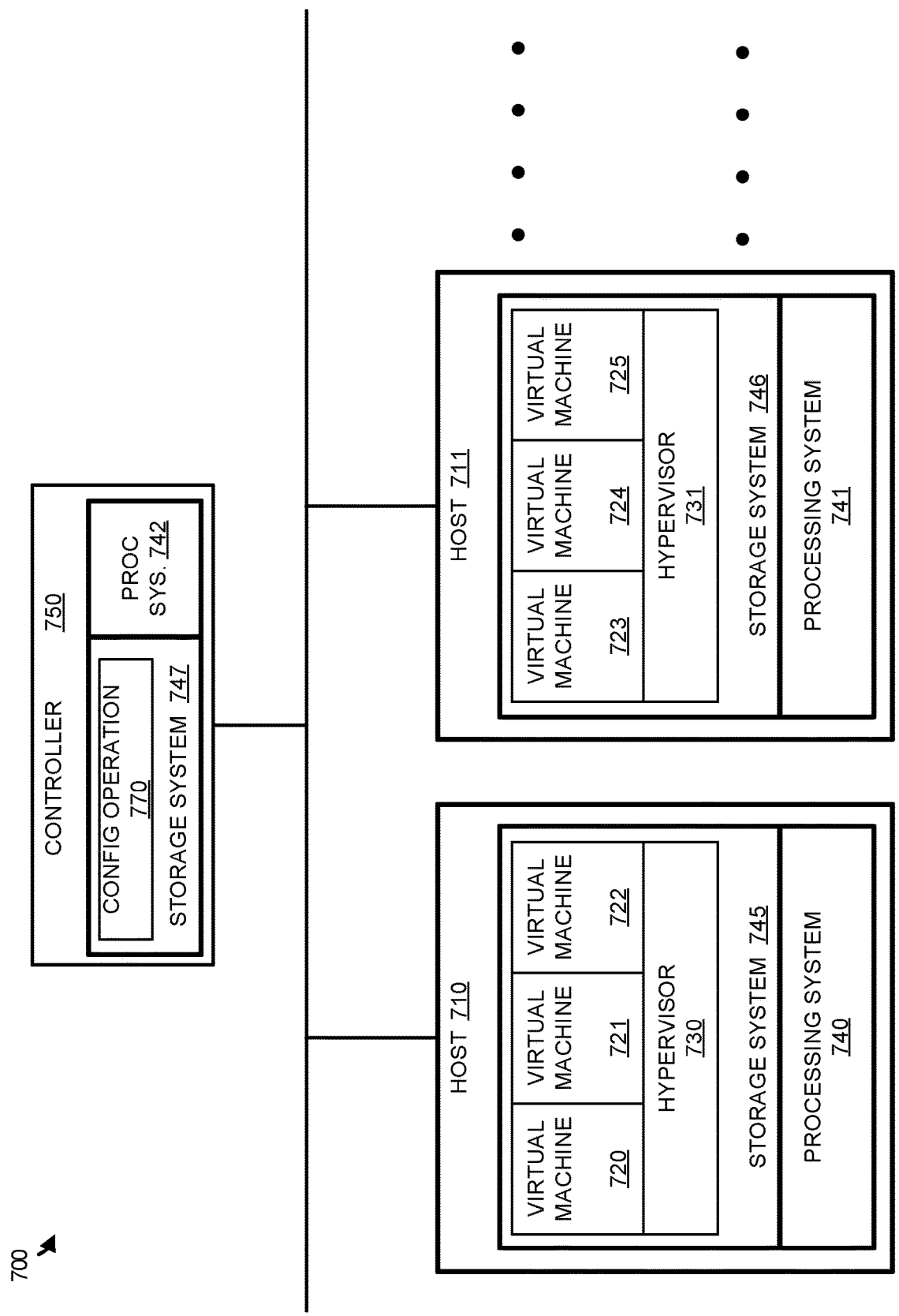
FIG. 7 illustrates a computing environment for deploying virtual machines according to an implementation.

FIG. 7 illustrates a computing environment 700 for deploying virtual machines according to an implementation. Computing environment 700 is an example deployment of virtual machines, and includes hosts 710-711 and controller 750. Hosts 710-711 may comprise serving computing systems, desktop computing systems, or any other similar type of computing system. Controller 750 may comprise one or more serving computing systems, desktop computing systems, or any other similar type of computing system. Hosts 710-711 and controller 750 include processing systems 740-742, which are operatively coupled to storage systems 745-747, respectively. Although not illustrated in the present example, it should be understood that hosts 710-711 and controller 750 include communication interfaces to provide communication with other computing systems, and in some examples user interfaces to provide user input/output operations. The communication interfaces may be configured to communicate over metallic, wireless, or optical links, and may be configured to use Time Division Multiplex (TDM), Internet Protocol (IP), Ethernet, optical networking, wireless protocols, communication signaling, or some other communication format—including combinations thereof.

Processing systems 740-742 each comprise microprocessor and other circuitry that retrieves and executes software from corresponding storage systems 745-747. Storage systems 745-747 may each include volatile and nonvolatile, removable and non-removable media implemented in any method or technology for storage of information, such as computer readable instructions, data structures, program modules, or other data. Storage systems 745-747 may each be implemented as a single storage device, but may also be implemented across multiple storage devices or sub-systems. Storage systems 745-747 may comprise additional elements, such as a controller to read operating software. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

In operation, hypervisors 730-731 when read and executed by processing systems 740-741 provide a platform for executing virtual machines 720-725. In particular, hypervisors 730-731 may be responsible for abstracting physical components of a computing system and providing the components as virtual components to each virtual machine of virtual machines 720-725. These components may include processing systems, network interfaces, and other similar computing components. In addition to providing the components to virtual machines 720-725, hypervisors 730-731 also provides software defined networking operations to the virtual machines. This software defined networking operations includes identifying data communications to and from virtual machines 720-725 and forwarding the communications using a data plane forwarding configuration. This configuration may be used to implement switches, routers, firewalls, and other similar networking devices.

To manage the data plane forwarding configuration, configuration operation 770 is provided that, when read and executed by processing system 742, directs processing system 742 to configure the data plane on hosts 710-711 using operations similar to those described in method 200 of FIG. 2. In particular configuration operation 770 may direct processing system 742 to maintain a data plane forwarding configuration for computing environment 700, wherein the data plane forwarding configuration is used to identify attributes (MAC addresses, IP addresses, logical ports, etc.) for a communication to or from a virtual machine, and apply a forwarding action based on the identified attributes. For example, a data plane forwarding configuration for a software defined networks provided by hypervisors 730-731 may identify a source IP address and a destination IP address for a communication and forward the communication based on the IP addresses.

While maintaining the data plane forwarding configuration, configuration operation 770 directs processing system 742 to identify a group of one or more virtual machines to be deployed in computing environment 700. Once identified, configuration operation 770 may identify, for each virtual machine of the group, at least a first tag and a second tag associated with the virtual machine. In some implementations, the tags may be used to limit the number of forwarding rules that must be developed and deployed by administrators of a computing environment. In particular, when multiple tenants employ a similar configuration, the tenants may share a rule set, and be provided with segregation using at least one entity tag. As an illustrative example, a rule set may define that virtual machines with an application tag may communicate with virtual machines with a database tag. In addition to the application or database tag with a virtual machine, the virtual machine may also be provided with at least one entity tag that is used to ensure that the application and database virtual machines associated with the particular tenant may be in communication. Accordingly, if tenants comprised a testing tenant and a deployed tenant, the testing tenant would be incapable of communicating with the deployed tenant virtual machines.

Once the tags are identified, configuration operation 770 directs processing system 703 to update the data plane forwarding configuration based on the tags. In particular, for each virtual machine, controller 750 may identify other virtual machines that are available for communication based on the tags. Referring to the example of the application and database virtual machines, for an application virtual machine, controller 750 may identify one or more database virtual machines that are associated with the same entity as the application machine. After being identified, attributes of the database virtual machines (IP addresses, MAC addresses, logical ports, etc.) may be identified and used in configuring the logic of the data plane forwarding configuration of the software defined networks. As a result, when a communication is initiated by the application virtual machine, the data plane forwarding configuration may be used in conjunction with attributes identified in the communication to determine whether to permit the communication.

Although illustrated as being separate from hosts 710-711, it should be understood that in some implementations configuration operation 770 or controller 750 may be implemented wholly or partially on hosts 710-711. Additionally, while demonstrated in the present example as using two hosts, it should be understood that any number of host computing systems may be deployed in a computing environment to provide the platform for virtual machines.

Although described in FIGS. 1-7 using virtual machines, it should be understood that similar operations may be provided to other virtual endpoints or nodes, such as Linux containers, Docker containers, and other similar namespace based containers. Rather than requiring a separate operating system, which is required for virtual machines, containers may share resources from the host computing system, wherein the resources may include kernel resources from the host operating system, and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint.

In the example of using namespace based containers, rather than relying on the hypervisor to identify the deployment of a computing node, the controller may receive an update from a host operating system or platform for the container. Based on the update, which may include an identifier for the container, at least one security tag for the container, and at least one entity tag for the container, the controller may determine any changes that are required for a data plane of the software defined networks. This may include adding an IP address, MAC address, logical port, or the like for the container to forwarding data structures of the software defined networks based on the tags and the corresponding forwarding rules.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   maintaining a data plane forwarding configuration for software defined networks in a computing environment based on forwarding rules, wherein the software defined networks comprise a plurality of virtual machines for a plurality of entities that share the computing environment, wherein the forwarding rules define actions to be taken against data packets based at least on a combination of two or more tags associated with each virtual machine in the software defined networks, wherein the two or more tags for each virtual machine comprise an entity tag that identifies an entity of the plurality of entities to which the virtual machine belongs and a security group tag that identifies a type of operation provided by the virtual machine, wherein the data plane forwarding configuration associates one or more addressing attributes identified in a data packet with a corresponding action, and wherein the one or more addressing attributes are associated with at least one virtual machine of the plurality of virtual machines and comprise one or more internet protocol (IP) addresses, one or more logical ports, or one or more media access control (MAC) addresses;

identifying a virtual machine for addition to the software defined networks, the virtual machine having at least an entity tag and a security group tag;

identifying a subset of the forwarding rules that apply to the virtual machine based on at least a combination of the entity tag and the security group tag associated the virtual machine; and updating the data plane forwarding configuration based on the subset of the forwarding rules that apply to the virtual machine.

2. The method of claim 1, wherein each forwarding rule in the forwarding rules comprises at least a source security group tag, a destination security group tag, and an action.

3. The method of claim 1, wherein two or more virtual machines in the plurality of virtual machines share a common security group tag.

4. The method of claim 1, wherein the virtual machine comprises a web application virtual machine.

5. The method of claim 1 further comprising:
identifying a third tag associated with the virtual machine, and
wherein identifying the subset of forwarding rules that apply to the virtual machine is further based on the third tag.

6. A computing apparatus comprising:
one or more non-transitory computer readable storage media;
a processing system operatively coupled to the one or more non-transitory computer readable storage media; and
program instructions stored on the one or more non-transitory computer readable storage media to manage a configuration of software defined networks that, when read and executed by the processing system, direct the processing system to at least:
maintain a data plane forwarding configuration for software defined networks in a computing environment based on forwarding rules, wherein the software defined networks comprise a plurality of virtual machines for a plurality of entities that share the computing environment, wherein the forwarding rules define actions to be taken against data packets based at least on a combination of two or more tags associated with each virtual machine in the software defined networks, wherein the two or more tags for each virtual machine comprise an entity tag that identifies an entity of the plurality of entities to which the virtual machine belongs and a security group tag that identifies a type of operation provided by the virtual machine, wherein the data plane forwarding configuration associates one or more addressing attributes identified in a data packet with a corresponding action, and wherein the one or more addressing attributes are associated with at least one virtual machine of the plurality of virtual machines and comprise one or more internet protocol (IP) addresses, one or more logical ports, or one or more media access control (MAC) addresses;

identify a virtual machine for addition to the software defined networks, the virtual machine having at least an entity tag and a security group tag;

identify a subset of the forwarding rules that apply to the virtual machine based on at least a combination of the entity tag and the security group tag associated the virtual machine; and update the data plane forwarding configuration based on the subset of the forwarding rules that apply to the virtual machine.

7. The computing apparatus of claim 6, wherein each forwarding rule in the forwarding rules comprises at least a source security group tag, a destination security group tag, and an action.

8. The computing apparatus of claim 6, wherein two or more virtual machines in the plurality of virtual machines share a common security group tag.

9. The computing apparatus of claim 6, wherein the virtual machine comprises a web application virtual machine.

10. The computing apparatus of claim 6, wherein the program instructions further direct the processing system to identify a third tag associated with the virtual machine, and wherein identifying the subset of forwarding rules that apply to the virtual machine is further based on the third tag.

11. The computing apparatus of claim 6, wherein the program instructions further direct the processing system to:
identify a second virtual machine for addition to the software defined networks, the second virtual machine having at least an entity tag and a security group tag;
identify a second subset of the forwarding rules that apply to the second virtual machine based at least on a combination of the entity tag and the security group tag associated with the second virtual machine; and
update the data plane forwarding configuration based on a second subset of the forwarding rules that apply to the second virtual machine.

12. An apparatus comprising:
one or more non-transitory computer readable storage media;
program instructions stored on the one or more non-transitory computer readable storage media to manage a configuration of software defined networks that, when read and executed by a processing system, direct the processing system to at least:
maintain a data plane forwarding configuration for software defined networks in a computing environment based on forwarding rules, wherein the software defined networks comprise a plurality of virtual machines for a plurality of entities that share the computing environment, wherein the forwarding rules define actions to be taken against data packets based at least on a combination of two or more tags associated with each virtual machine in the software defined networks, wherein the two or more tags for each virtual machine comprise an entity tag that identifies an entity of the plurality of entities to which the virtual machine belongs and a security group tag that identifies a type of operation provided by the virtual machine, wherein the data plane forwarding configuration associates one or more addressing attributes identified in a data packet with a corresponding action, and wherein the one or more addressing attributes are associated with at least one virtual machine of the plurality of virtual machines and comprise one or more internet protocol (IP) addresses, one or more logical ports, or one or more media access control (MAC) addresses;

identify a virtual machine for addition to the software defined networks, the virtual machine having at least an entity tag and a security group tag;

identify a subset of the forwarding rules that apply to the virtual machine based on at least a combination of the entity tag and the security group tag associated the virtual machine; and update the data plane forwarding configuration based on the subset of the forwarding rules that apply to the virtual machine.

13. The apparatus of claim 12, wherein each forwarding rule in the forwarding rules comprises at least a source security group tag, a destination security group tag, and an action.

14. The apparatus of claim 13, wherein two or more virtual machines in the plurality of virtual machines share a common security group tag.

15. The apparatus of claim 12, wherein the virtual machine comprises a web application virtual machine.

16. The apparatus of claim 12, wherein the program instructions further direct the processing system to identify a third tag associated with the virtual machine, and wherein identifying the subset of forwarding rules that apply to the virtual machine is further based on the third tag.

17. The apparatus of claim 12, wherein the program instructions further direct the processing system to:

identify a second virtual machine for addition to the software defined networks, the second virtual machine having at least an entity tag and a security group tag;

identify a second subset of the forwarding rules that apply to the second virtual machine based at least on a combination of the entity tag and the security group tag associated with the second virtual machine; and update the data plane forwarding configuration based on a second subset of the forwarding rules that apply to the second virtual machine.

* * * * *